United States Patent [19]

Myszak, Jr.

[11] Patent Number: 5,409,980
[45] Date of Patent: Apr. 25, 1995

[54] FLAME RETARDANT COMPOSITIONS

[75] Inventor: Edward A. Myszak, Jr., West Chester, Pa.

[73] Assignee: PQ Corporation, Valley Forge, Pa.

[21] Appl. No.: 84,227

[22] PCT Filed: Nov. 3, 1992

[86] PCT No.: PCT/US92/09405

§ 371 Date: Oct. 18, 1993

§ 102(e) Date: Oct. 18, 1993

[87] PCT Pub. No.: WO93/09169

PCT Pub. Date: May 13, 1993

Related U.S. Application Data

[63] Continuation-in-part of Ser. No. 787,585, Nov. 4, 1991, abandoned.

[51] Int. Cl.⁶ .......................... C08J 5/10; C08K 3/10; C08L 23/12
[52] U.S. Cl. .................... 524/409; 524/408; 524/410; 524/412; 524/167; 524/169; 524/171
[58] Field of Search ............... 524/408, 409, 410, 412, 524/418, 167, 169, 171

[56] References Cited

U.S. PATENT DOCUMENTS

| | | | |
|---|---|---|---|
| 3,718,584 | 2/1973 | Beste et al. | 252/8.1 |
| 3,766,065 | 10/1973 | Chay et al. | 252/8.1 |
| 3,860,523 | 1/1975 | Petrow et al. | 252/8.1 |
| 3,960,989 | 6/1976 | Petrow et al. | 260/884 |
| 4,006,118 | 2/1977 | Ogawa et al. | 260/45.75 B |
| 4,451,423 | 5/1984 | Reinehr et al. | 264/182 |
| 4,616,049 | 10/1986 | Thompson et al. | 523/212 |
| 4,845,146 | 7/1989 | Inoue et al. | 524/436 |
| 4,863,764 | 9/1989 | Davis et al. | 427/393.3 |
| 5,034,439 | 7/1991 | Breitenfellner et al. | 524/94 |
| 5,071,894 | 2/1992 | Weil et al. | 524/127 |

FOREIGN PATENT DOCUMENTS 0163254 12/1985 European Pat. Off.

Primary Examiner—Paul R. Michl
Assistant Examiner—U. K. Rajguru
Attorney, Agent, or Firm—Ratner & Prestia

[57] ABSTRACT

The present invention comprises flame retardant composition including a finely dispersed inorganic ultra fine particulate flame or smoke retardant material where the particles are no larger than 500 nanometers (0.50 $\mu$) in size. Preferably, the particles used are below 50 (0.050 $\mu$) nanometers in size and comprise antimony pentoxide ($Sb_2O_5$), the synthetic resin preferably is a polyolefin, preferably polypropylene, and the composition includes a halogenated retardant compound, preferably a brominated alkoxydiphenyl sulfone.

26 Claims, No Drawings

FLAME RETARDANT COMPOSITIONS

CROSS REFERENCES TO RELATED APPLICATIONS

This application is a continuation-in-part of U.S. patent application Ser. No. 07/787,585 filed Nov. 4, 1991, now abandoned.

FIELD OF THE INVENTION

The present invention relates to synthetic resins which are made flame and smoke retardant by the addition of certain flame and smoke retardant materials, while retaining their mechanical and/or optical properties.

BACKGROUND OF THE INVENTION

Flame and smoke retardant materials generally fall into two categories, halogenated retardants and non-halogenated retardants. Retardants, as used unmodified herein, refers to both flame and smoke retardants. Non-halogenated systems, such as magnesium hydroxide, aluminum trihydrate, ammonium phosphate, etc. generally require loadings of up to 60% of flame retardant in the resinous compound. This is due to the mechanism by which the retardant works. For instance, aluminum trihydrate operates by releasing water upon heating. The dehydration reaction is endothermic and absorbs some of the heat of reaction of the resinous compound.

In resinous fiber production, loadings above 8% retardant are generally not considered acceptable. This is especially true with respect to fine denier (very small diameter) fibers. Lower loadings may be achieved by the use of halogenated systems. See, for example, U.S. Pat. No. 4,006,118 showing a brominated alkoxydiphenyl sulfone derivative useful as an additive in thermoplastic polymer compositions, to act as a flame retardant.

However, even most halogenated retardant compounds cannot achieve acceptable flame and smoke retardancy with such small load levels. Thus, manufacturers have turned to the use of hybrid retardants comprising both non-halogenated and halogenated systems. The two systems seem to have a synergistic effect and can be used together at lower load levels to achieve better flame and smoke retardancy than either compound alone could achieve.

Antimony trioxide ($Sb_2O_3$) is one non-halogenated compound which has been used as a flame retardant additive in conjunction with halogenated retardant compounds. Antimony trioxide is a particulate compound and is mixed with the base compound and the halogenated retardant compound to form a flame retardant system.

Heretofore however, the addition of particulate retardants such as antimony trioxide has caused a deterioration in the physical properties of the resin, specifically, a reduction in strength and a deterioration in the optical properties of the material. Thus when halogenated retardant compounds are used alone, they generally do not perform satisfactorily in producing a flame retardant material. When inorganic particulates are added, the physical properties of the material, particularly mechanical strength and optical properties, are greatly diminished.

SUMMARY OF THE INVENTION

The present invention overcomes these deficiencies by providing a flame retardant composition including a finely dispersed inorganic ultra fine particulate flame or smoke retardant material where the particles are no larger than 500 nanometers (0.50 $\mu$) in size. Preferably, the composition comprises an antimony oxide with brominated alkoxydiphenyl sulfone, and most preferably antimony pentoxide with brominated alkoxydiphenyl sulfone where the particles of antimony pentoxide are below 50 (0.050 $\mu$) nanometers in size, and the synthetic resin is a polyolefin, such as polypropylene, polyethylene, ABS, nylon, flexible PVC, PET, polystyrene or a copolymer blend of polypropylene and polyethylene.

DETAILED DESCRIPTION OF THE INVENTION

It has been found that by using particles below 500 nanometers in size (0.50 microns) a resinous product can be produced having substantially the same retardant properties as compositions formulated with larger particle sizes, but without the decrease in strength and optical properties occasioned by the use of larger particles.

The increase in strength may occur due to the increased ability to achieve an even distribution and dispersion of a finer material in the resinous matrix. Furthermore, particles tend to cause cracks and discontinuities in the resinous matrix, especially where the flame retardant material is not evenly dispersed. This is particularly true for fine denier fibers. Such fibers may have diameters on the order of 15 microns. In a 15 micron diameter fiber (which corresponds to a 1.5 denier polypropylene fiber), a 1 micron retardant particle occupies 7% of the cross-sectional area of the fiber, whereas a 30 nanometer (0.030 $\mu$) particle occupies only 0.2% of the cross-sectional area. A one micron particle in this matrix could easily form the basis for a structural crack, compromising the strength of the fiber. A more even dispersal of 30 nanometer (0.030 $\mu$) particles is much less likely to cause fatal flaws, increasing the overall strength of the fiber. This will have a substantial effect on the strength of such a fiber.

It has also been found that particle size also affects the optical properties of the composition. Very small and very large particles do not tend to affect the clarity of a resinous composition as much as intermediate sized particles. The particles used for retardant compositions in the prior art are generally greater than 1 micron in size. These particles cause the resulting composition to be opaque. This is especially true in the case of antimony trioxide since, in other compositions, antimony trioxide is used as a pigment. This effect is most noticeable when colored compositions are desired. In this case, the antimony trioxide of conventional particle size tends to whiten the material, increasing the amount of colored pigment needed to produce the desired shade. Further, a compound without the antimony trioxide generally possesses a richer, deeper and more aesthetically pleasing color.

It has been found that, in polypropylene resin, antimony pentoxide particles of 0.03 micron (30 nanometer), 0.05 micron (50 nanometer) or 0.15 micron (150 nanometer) in size are preferred. Such particles performed very well when mixed with brominated alkoxydiphenyl sulfone in a 1:3 molar ratio of antimony to bromine, although ratios between 1:2 and 1:7 have been used and found effective. Antimony pentoxide particles of this size are available from PQ Corporation of Valley Forge, Pa., under the registered trademark NYACOL ADP-480. The antimony oxide compositions with small particles were found to perform comparably in flame retardancy to compositions with antimony trioxide particles on the order of 1 micron in size at the same loading level. The physical properties of those resins including small antimony oxide particles were superior to those of compositions with large particles, both in mechanical strength and in optical properties.

The flame retardant compositions of the present invention may include a variety of synthetic resins, including polyolefins such as polypropylene, polyethylene, ABS, nylon, flexible PVC, PET, polystyrene and a copolymer blend of polypropylene and polyethylene.

It has also been found that other flame retardant compounds having relatively small particle size also perform well on flame retardancy tests without compromising their physical or optical properties. For example, a modifiedmagnesiumhydroxide ($Mg(OH)_2$), having a particle size of 225 nanometers (0.225 $\mu$), performed adequately. Furthermore, when these particles of modified magnesium hydroxide were mixed with commercial magnesium hydroxide, the resulting composition performed quite well in flame retardancy, optical properties, and physical properties.

When mixed with thermal or ultraviolet light stabilizers, compositions of the present invention did not suffer a significant loss of flame retardant properties, or physical or optical properties. However, mixing a composition of the present invention with some smoke suppressants resulted in some compositions which were not as flame retardant. This is likely caused by the properties of the smoke suppressants themselves, which encourage cleaner, and more efficient, burning.

EXAMPLE 1

In order to demonstrate the present invention, experiments were conducted with polypropylene to show the effects of different retardant materials, alone and in combination, including their effect on optical properties. Polypropylene was extruded and tested alone in order to provide a control sample. The polypropylene was then mixed with the particulate retardants antimony pentoxide ($Sb_2O_5$) (of 1 $\mu$ size) and antimony trioxide ($Sb_2O_3$) (of 0.030 $\mu$ size) (collectively referred to as antimony oxides) as well as three brominated retardants; Nonnen 52, which is a brominaned alkoxydiphenyl sulfone, which is the subject of U.S. Pat. No. 4,006,118; Pyronil 63 which is a brominated phthalate ester available from Atochem in King of Prussia, Pa.; and Pyro-Chek C60PB which is a brominated polystyrene available from Ferro Corporation in Hammond, Ind. Each retardant was tested separately.

Next, the various particulate retardant compounds were mixed with the brominated retardant compounds variously to determine the operability of the compounds and their ability to retard flame. The antimony oxides were mixed with the three brominated compounds referred to above, as well as Pyro-Chek C68PB (which is a brominated polystyrene available from Ferro Corporation in Hammond, Ind.), and Clorez 760 which is a chlorinated paraffin available from Dover Chemical Company in Dover, Ohio. The compounds were mixed in a 1:3 molar ratio of antimony to halide, whether chlorine or bromine. For most tests, loadings of 12%, 8%, and 4% of the flame retardant by weight of the polypropylene were tested. Those that passed the flame retardancy test were also tested for strength. The results of these tests are reported in Table 1.

TABLE 1

| | Flame Retardant Compound | Halide | % Flame Retardant | UL-94 | After-flame (sec.) | ASTM D2863 % LOI | ASTM D256 Notched Izod Impact | ASTM D638 % Elongation @ Yield | ASTM D638 Tensile Strength @ Yield | Opacity | L.a.b. |
|---|---|---|---|---|---|---|---|---|---|---|---|
| 1 | None | None | N/A | Fail | N/A | 17.3 | 0.64 | 16.8 | 4937 | Transparent | 0.00 |
| 2 | Pentoxide | None | 12.0 | Fail | N/A | 17.4 | | 14.7 | 4863 | Opaque | 45.68 |
| 3 | Trioxide | None | 12.0 | Fail | N/A | 17.1 | | 13.8 | 5211 | Opaque | 60.83 |
| 4 | None | Nonnen 52 | 12.0 | | | | Could Not Extrude | | | | |
| 5 | None | Pyronil 63 | 12.0 | Fail | N/A | 22.7 | | 13.0 | 4724 | Opaque | 43.34 |
| 6 | None | C60PB | 12.0 | Fail | N/A | 19.3 | | 11.2 | 3947 | S Transparent | 30.30 |
| 7 | Pentoxide | Nonnen 52 | 12.0 | V-2 | 0 | 23.6 | 0.62 | 8.0 | 5168 | Opaque | 51.08 |
| 8 | Pentoxide | Nonnen 52 | 8.0 | V-2 | 0 | 28.6 | 0.63 | 9.9 | 5087 | Opaque | 50.83 |
| 9 | Pentoxide | Nonnen 52 | 4.0 | V-2 | 0 | 26.9 | 0.58 | 11.4 | 5173 | VS Transparent | 43.70 |
| 10 | Pentoxide | Nonnen 52 | 2.5 | V-2 | 3 | 25.0 | 0.64 | 15.9 | 5144 | S Transparent | 37.25 |
| 11 | Pentoxide | Nonnen 52 | 1.0 | V-2 | 4 | 20.1 | 0.65 | 16.1 | 5068 | Transparent | 19.39 |
| 12 | Trioxide | Nonnen 52 | 12.0 | V-0 | 0 | 32.3 | 0.44 | 9.9 | 5040 | Opaque | 54.40 |
| 13 | Trioxide | Nonnen 52 | 8.0 | V-0 | 0 | 32.9 | 0.36 | 11.5 | 4863 | Opaque | 53.35 |
| 14 | Trioxide | Nonnen 52 | 4.0 | V-2 | 0 | 28.9 | 0.35 | 13.8 | 4892 | Opaque | 52.11 |
| 15 | Trioxide | Nonnen 52 | 2.5 | V-2 | 0 | 24.6 | 0.37 | 13.7 | 5141 | Opaque | 47.11 |
| 16 | Trioxide | Nonnen 52 | 1.0 | Fail | N/A | 21.6 | 0.37 | 14.8 | 5122 | VS Transparent | 35.72 |
| 17 | Pentoxide | Pyronil 63 | | | | | Could Not Extrude (at all loadings) | | | | |
| 18 | Trioxide | Pyronil 63 | 12.0 | Fail | N/A | 22.9 | | 13.3 | 4931 | Opaque | 56.88 |
| 19 | Pentoxide | C60PB | 12.0 | Fail | N/A | 18.5 | | 12.4 | 4137 | Opaque | 45.30 |
| 20 | Trioxide | C60PB | 12.0 | Fail | N/A | 20.3 | | 12.1 | 4025 | Opaque | 51.80 |
| 21 | Pentoxide | C68PB | 12.0 | Fail | N/A | 18.5 | | 14.1 | 4267 | Opaque | 46.63 |
| 22 | Trioxide | C68PB | 12.0 | Fail | N/A | 20.5 | | 10.4 | 4619 | Opaque | 56.02 |
| 23 | Pentoxide | Clorez 760 | 2.5 | Fail | N/A | 19.6 | 0.34 | 15.2 | 5152 | Transparent | 22.84 |
| 24 | Pentoxide** | Nonnen 52 | 12.0 | V-0 | 0 | 25.0 | | 13.5 | 5154 | Blue/Opaq. | 8.73* |
| 25 | Pentoxide** | Nonnen 52 | 8.0 | V-0 | 0 | 27.5 | | 9.3 | 5238 | Blue/Opaq. | 6.69* |
| 26 | Pentoxide** | Nonnen 52 | 4.0 | V-0 | 25 | 26.4 | | 11.6 | 5376 | Blue/Opaq. | 0.00* |
| 27 | Trioxide** | Nonnen 52 | 12.0 | V-0 | 0 | 31.9 | | 9.2 | 5303 | Lt. Blue/Opaq. | 11.97* |
| 28 | Trioxide** | Nonnen 52 | 8.0 | V-0 | 0 | 34.0 | | 9.6 | 5433 | Lt. Blue/Opaq. | 9.49* |
| 29 | Trioxide** | Nonnen 52 | 4.0 | V-0 | 0 | 28.5 | | 11.0 | 5413 | Blue/Opaq. | 5.37* |
| 30 | Pentoxide*** | Nonnen 52 | 12.0 | V-0 | 45 | 25.0 | | 8.8 | 5158 | Pink/Opaq. | 6.52* |
| 31 | Pentoxide*** | Nonnen 52 | 8.0 | V-0 | 0 | 26.5 | | 11.8 | 5074 | Pink/Opaq. | 3.67* |
| 32 | Pentoxide*** | Nonnen 52 | 4.0 | V-0 | 0 | 27.0 | | 11.5 | 5306 | Pink/Opaq. | 0.00* |

TABLE 1-continued

| Flame Retardant Compound | Halide | % Flame Retardant | UL-94 | After-flame (sec.) | ASTM D2863 % LOI | ASTM D256 Notched Izod Impact | ASTM D638 % Elongation @ Yield | ASTM D638 Tensile Strength @ Yield | Opacity | L.a.b. |
| --- | --- | --- | --- | --- | --- | --- | --- | --- | --- | --- |
| 33 Trioxide*** | Nonnen 52 | 12.0 | V-0 | 0 | 32.3 | | 9.6 | 5176 | Lt. Pink/Opaq. | 7.53* |
| 34 Trioxide*** | Nonnen 52 | 8.0 | V-0 | 0 | 33.6 | | 11.0 | 5161 | Lt. Pink/Opaq. | 6.08* |
| 35 Trioxide*** | Nonnen 52 | 4.0 | V-0 | 1 | 27.3 | | 12.6 | 5145 | Pink/Opaq. | 3.84* |

For all test reported on this Table, Antimony Pentoxide had a particle size of 30 nm and Antimony Trioxide had a particle size of 1000 nm.
*Pentoxide with 4% Nonnen 52 used as reference
**Blue dye added
***Red dye added The first test performed on the samples was a flame retardancy test, UL-94, as specified by Underwriter Laboratories. In short, the test involves holding a Bunsen burner under a specimen, with a piece of surgical cotton 305 mm below the lower edge of the specimen. The flame is applied to the specimen for two 10 second periods.

The classification applied to the specimen is determined as follows. The specimen is given the classification V-0 if: the afterflame time is less than 10 seconds, the sum of the afterflame times for 10 applications of the flame does not exceed 50 seconds, and there are no burning drops. The specimen is given the classification V-1 if the afterflame time is less than 30 seconds, the sum of the afterflame times for 10 applications of the flame does not exceed 250 seconds, and there are no burning drops. The specimen is given the classification V-2 if the afterflame time is less than 30 seconds, the sum of the afterflame times for 10 applications of the flame does not exceed 250 seconds, but the surgical cotton is ignited by burning drops. If the specimen does not qualify as V-2, it fails the test.

It was found that only the polypropylene samples containing the antimony oxides mixed with Nonnen 52 were able to pass the UL-94 fire retardancy test. This showed that the small particle (30 nanometers or 0.030 $\mu$) antimony pentoxide performed comparably to the larger particle (1 micron ($\mu$)) antimony trioxide in flame retardancy. Thus, for the same loading, the smaller particle size did not adversely effect the flame retardant properties of the resulting material. This was also demonstrated by comparison of the results of tests of 1.0 $\mu$ and 0.138 $\mu$ antimony trioxide as will be explained presently.

The next test performed was ASTM (American Standard Test Method) test D2863, which reports percentage of limiting oxygen index needed to maintain burning in the sample. Since air is 20% oxygen, presumably anything that requires greater than 20% oxygen to maintain combustion, should be flame retardant. In actual practice this is not always true inasmuch as high temperatures caused by fires may decrease the oxygen content necessary to maintain combustion. However for purposes of the test, 20% is the oxygen level considered flame retardant.

Those samples which passed the UL-94 test (samples 7 through 15) all performed well in the ASTM D2863 test. Again, this indicates that the compositions with smaller particle size retain their flame retardancy. It should be noted that samples 24 through 35 have not yet been discussed because those samples included coloring additives, which were primarily intended to demonstrate the differences in optical properties which arise from the use of smaller antimony pentoxide particles as opposed to the larger antimony trioxide particles. The dye had little or no effect on flame retardancy or strength, and colored samples performed similarly to the samples without dye. The particular results can be seen from Table 1.

The next test performed evaluated the strength of the material. This test was ASTM D256 Notched Izod Impact test. In this test, a notched sample test piece is secured, and a pendulum is swung so as to contact the test piece. The pendulum is of a weight and is swung from a height sufficient to break the test piece. The test then produces a value reflecting the strength of the material. A higher value corresponds to a higher strength. The results can be seen in Table 1. The formulations which included the smaller pentoxide particles had significantly greater strength than the formulations including the larger trioxide particles. Further, the strength of the material with the antimony pentoxide particles was comparable to the strength of the material with no retardant additives.

Strength test ASTM D638, which is used to test for percent elongation at yield and tensile strength at yield, was also performed on the samples. The results from this test were inconclusive, in that they did not show better strength by either the pentoxide or trioxide samples. This is not surprising since compared to the particle size (0.030 $\mu$ and 1.0 $\mu$), these samples were quite thick and in a test such as this one, crack propagation is not critical, as it is in the notched izod impact test. Thus, one would expect quite similar results until the cross-sectional area of the samples tested decreased significantly, and the percentage of the cross-sectional area of the test piece occupied by the particle increased.

Finally, a test of the optical properties of the materials was performed. The materials were tested on a Minolta CR-200 chromometer, with pure polypropylene used as the base standard. The transparency of the samples was also compared visually. A ⅛ inch test piece was placed over a black dot on a white background. Transparency was tested by attempting to discern the black dot through the test piece. Pure polypropylene was found to be visually transparent.

In the visual test, the samples with 0.030 $\mu$ pentoxide were found to perform far better than those with the 1.0 $\mu$ trioxide compound. The samples with pentoxide were found to be very slightly transparent at loadings as high as 4%, whereas the trioxide compound was found to be very slightly transparent only at a 1% loading which did not pass the UL-94 flame retardancy test.

In the L*a*b* total color difference test, performed on a Minolta CR-200 chromometer, the hue and chroma of each test piece is plotted on X, Y, Z axes, where color is plotted on the X, Y plane and brightness in the Z plane. Total color difference is obtained by finding the straight line distance between coordinates of the sample and the standard on this X, Y, Z graph. A greater number indicates a greater difference in color from the standard. In this test, the 0.030 μ pentoxide compounds again proved superior to the 1.0 μ trioxide compounds as may be seen by the lower numbers generated for the pentoxide compounds in this L*a*b* total color difference test.

It should be noted that colored samples were also tested, as may be seen from samples 24 through 35. Samples 24 through 29 included a blue dye, while samples 30 through 35 included a red dye. For each of these, the 4% loading pentoxide sample of the same color was used as the standard in the L*a*b* total color difference test. Again, the pentoxides performed much better than the trioxide formulated compounds. In all instances, the trioxide compounds tended to be whiter and more opaque. Especially when colorants are added, this can be a significant difference in that a greater whitening effect can increase the need for and cost of dye, as well as decreasing the overall visual aesthetic qualities of the molded pieces.

The microfine (0.03 micron diameter), antimony pentoxide compositions were found to perform comparably in retardancy properties to antimony trioxide particles on the order of 1 micron diameter. However, in physical properties, the smaller particle antimony pentoxide was found to outperform the large antimony trioxide compounds both in mechanical strength and in optical properties.

EXAMPLE 2

In order to demonstrate that flame retardant compositions of the present invention perform satisfactorily for many polyolefins, not just polypropylene, the tests performed in Example 1 were also performed on additional samples with different synthetic resins. For each synthetic resin, the resin was tested alone in order to provide a control sample. As in Example 1, the resin was mixed with antimony pentoxide, which had a particle size of 0.03 microns (0.03 μ) in diameter, and antimony trioxide, which had a particle size of 1.0 micron (1.0 μ) in diameter. Most of the samples were also mixed with Nonnen 52 the brominated alkoxydiphenyl sulfone referred to in Example 1. Two other flame retardants were used in the samples with nylon 6 as the synthetic resin in amounts of 1.5 wt %: Mach 1 which is a colloidal sized iron oxide ($Fe_2O_3$) having a particle size of about 3 nanometers (3000 μ) and is available from Mach I, Inc. of King of Prussia, Pa.; and E-4182 (also known as Pigment Red 101) which is an iron oxide ($Fe_2O_3$) having a particle size of about 1 micron and is available from Akrochem of Akron, Ohio. As in Example 1, each retardant was tested separately.

Next, the various particulate retardant compounds were mixed with the brominated retardant compounds in various amounts to determine the operability of the compound and their ability to retard flame. As in Example 1, the compounds were mixed in a 1:3 molar ratio of antimony to halide. For most tests, flame retardant was loaded in an amount of 8%, 4% and 1% by weight. The results of these tests are reported in Table 2.

TABLE 2

| | Synthetic Resin | Flame Retardant Compound* | Halide | % Flame Retardant | UL-94 | Afterflame (sec.) | ASTM D2863 % LOI | ASTM D256 Notched Izod Impact |
|---|---|---|---|---|---|---|---|---|
| 1 | Polyethylene | None | None | N/A | Fail | N/A | 18.0 | 2.01 |
| 2 | Polyethylene | Pentoxide | Nonnen 52 | 4.0 | Fail | N/A | 18.0 | 1.55 |
| 3 | Polyethylene | Pentoxide | Nonnen 52 | 1.0 | Fail | N/A | 18.0 | 1.90 |
| 4 | Polyethylene | Trioxide | Nonnen 52 | 4.0 | Fail - 2nd burn | N/A | 19.5 | 1.43 |
| 5 | Polyethylene | Trioxide | Nonnen 52 | 1.0 | Fail | N/A | 18.5 | 1.67 |
| 6 | ABS | None | None | N/A | Fail (non-drip) | N/A | 19.0 | 5.22 |
| 7 | ABS | Pentoxide | Nonnen 52 | 8.0 | Fail | N/A | 20.0 | 4.81 |
| 8 | ABS | Trioxide | Nonnen 52 | 8.0 | Fail | N/A | 21.5 | 2.83 |
| 9 | Nylon 6 | None | None | N/A | V-2 | 24.0 | 20.0 | 1.0 |
| 10 | Nylon 6 | Pentoxide | Nonnen 52 | 8.0 | V-0 | 1.0 | 25.0 | 0.62 |
| 11 | Nylon 6 | Trioxide | Nonnen 52 | 8.0 | V-2 | 1.0 | 24.0 | 0.52 |
| 12 | Nylon 6** | Pentoxide | Nonnen 52 | 8.0 | V-2 | 2.0 | 24.0 | 0.70 |
| 13 | Nylon 6** | Trioxide | Nonnen 52 | 8.0 | V-2 | 1.0 | 25.0 | 0.61 |
| 14 | Nylon 6*** | Pentoxide | Nonnen 52 | 8.0 | V-2 | 2.0 | 25.0 | 0.35 |
| 15 | Nylon 6*** | Trioxide | Nonnen 52 | 8.0 | V-2 | 1.0 | 27.5 | 0.60 |
| 16 | Flexible PVC | None | None | N/A | Fail - 2nd burn | N/A | 23.0 | N/A |
| 17 | Flexible PVC | Pentoxide | None | 2.7 | V-0 | 5.4 | 22.5 | N/A |
| 18 | Flexible PVC | Trioxide | None | 2.0 | V-0 | 1.0 | 26.0 | N/A |
| 19 | PET | None | None | N/A | V-2 (drip - 1)² | 2.0 | 24.5 | 0.44 |
| 20 | PET | Pentoxide | Nonnen 52 | 8.0 | V-2 (drip - 2)² | 1.0 | 23.5 | 0.30 |
| 21 | PET | Trioxide | Nonnen 52 | 8.0 | V-2 (drip - 2)² | 2.0 | 28.5 | 0.31 |
| 22 | Polystyrene | None | None | N/A | Fail | N/A | 19.0 | 0.25 |
| 23 | Polystyrene | Pentoxide | Nonnen 52 | 8.0 | V-2 | 22.0 | 19.0 | 0.28 |
| 24 | Polystyrene | Trioxide | Nonnen 52 | 8.0 | V-2 | 7.0 | 22.0 | 0.27 |
| 25 | Copolymer | None | None | N/A | Fail - 1st burn | N/A | 17.0 | 12.5 |
| 26 | Copolymer | Pentoxide | Nonnen 52 | 4.0 | Fail - 2nd burn | N/A | 20.5 | 12.4 |
| 27 | Copolymer | Trioxide | Nonnen 52 | 4.0 | Fail - 2nd burn | N/A | 22.5 | 11.9 |

| | Synthetic Resin | Flame Retardant Compound* | ASTM D638 % Elongation @ Yield | ASTM D638 Tensile Strength @ Yield | Opacity | L.a.b. |
|---|---|---|---|---|---|---|
| 1 | Polyethylene | None | 421.49 | 2577 | Transparent | 0.00 |
| 2 | Polyethylene | Pentoxide | 387.66 | 2291 | V.S. Transparent | 19.42 |
| 3 | Polyethylene | Pentoxide | 256.23 | 2381 | Transparent | 2.69 |
| 4 | Polyethylene | Trioxide | 395.66 | 2285 | Opaque | 29.76 |
| 5 | Polyethylene | Trioxide | 221.49 | 2243 | Opaque | 13.57 |
| 6 | ABS | None | 20.3 | 5574 | V.S. Transparent | 0.00 |
| 7 | ABS | Pentoxide | 12.9 | 5807 | V.S. Transparent | 6.54 |
| 8 | ABS | Trioxide | 10.3 | 5896 | Opaque | 12.40 |

TABLE 2-continued

| | | | | | | |
|---|---|---|---|---|---|---|
| 9 | Nylon 6 | None | 172 | 8168 | Transparent | 0.00 |
| 10 | Nylon 6 | Pentoxide | 4.73 | 8176 | Opaque | 24.17 |
| 11 | Nylon 6 | Trioxide | 5.3 | 10146 | Opaque | 18.35 |
| 12 | Nylon 6** | Pentoxide | 5.19 | 8692 | Opaque | 29.86 |
| 13 | Nylon 6** | Trioxide | 5.09 | 10269 | Opaque | 27.61 |
| 14 | Nylon 6*** | Pentoxide | 4.05 | 7515 | Opaque | 30.08 |
| 15 | Nylon 6*** | Trioxide | 3.24 | 6838 | Opaque | 31.16 |
| 16 | Flexible PVC | None | 201 | 1764 | Transparent | 0.00 |
| 17 | Flexible PVC | Pentoxide | 215 | 1799 | Transparent | 1.88 |
| 18 | Flexible PVC | Trioxide | 213 | 1837 | Opaque | 50.30 |
| 19 | PET | None | 226 | 3947 | Transparent | 0.00 |
| 20 | PET | Pentoxide | 398 | 5851 | Transparent | 8.03 |
| 21 | PET | Trioxide | 4.2 | 7899 | Opaque | 50.22 |
| 22 | Polystyrene | None | 3.39 | 7285 | Transparent | 0.00 |
| 23 | Polystyrene | Pentoxide | 2.57 | 6433 | Transparent | 24.55 |
| 24 | Polystyrene | Trioxide | 2.77 | 6908 | Opaque | 50.57 |
| 25 | Copolymer | None | 606 | 3283 | S. Transparent | 0.00 |
| 26 | Copolymer | Pentoxide | 564 | 3119 | V.S. Transparent | 13.25 |
| 27 | Copolymer | Trioxide | 566 | 2965 | Opaque | 21.49 |

*For all tests reported on this Table, Antimony Pentoxide had a particle size of 30 nm and Antimony Trioxide had a particle size of 1000 nm.
**For samples 12 and 13, 1.5 weight percent Mach I was added.
***For samples 14 and 15, 1.5 weight percent E-4182 was added.
²drip 1 or 2 refers to ignition of surgical cotton by burning drops on the first or second burn The first additional polyolefin tested was polyethylene, as shown by Samples 1 through 5. Although all of these samples failed the UL-94 flame retardancy test, it is well known that polyethylene burns more readily than polypropylene. Therefore, if a higher weight percentage of flame retardant is used, the resulting composition would likely be flame retardant. Although these samples did not perform well in flame retardancy tests, the performance of the samples with the smaller pentoxide particles was comparable to the performance of the samples with the larger-size antimony trioxide particles. With respect to physical properties, the samples with the smaller antimony pentoxide particles outperformed the samples with larger antimony trioxide particles both in mechanical strength (as indicated by the ASTM D256 Notched Impact Test) and in optical properties.

The next synthetic resin tested was ABS (acrylonitrile-butadiene-styrene) as shown by Samples 6 through 8. Once again, these samples did not perform adequately in the flame retardancy tests; however, the performance of Sample 7, with the smaller pentoxide particles, was comparable to the performance of Sample 8, which included the larger antimony trioxide particles. Once again, higher loadings of flame retardants may be required to perform adequately in the flame retardancy tests. Comparing Sample 7 with Sample 8, it is clear that the physical properties and optical properties are better with the sample having the smaller antimony pentoxide particles.

The next synthetic resin tested was Nylon 6. In these samples, Samples 9 through 15, the smaller antimony pentoxide particles performed better than or comparable to the samples having the larger antimony trioxide particles in the flame retardancy tests. In fact, Sample 10 was the only sample of having a V-0 rating in the UL-94 flame retardancy test. A comparison of Sample No. 10 with Sample No. 11 in the Notched Impact Test and the L*a*b* total color difference test indicates that the composition with the small particles had better physical and optical properties than those with the larger particles.

In Samples 12 and 13, 1.5 weight percent Mach I was added and in Samples 14 and 15, 1.5 weight percent E-4182 was added to determine the effect of antimony pentoxide on compositions including iron oxides. With the addition of these iron oxides, the advantageous effects of the smaller particles were slightly diminished.

The next synthetic resin used was flexible PVC, as indicated in Samples 16 through 18. In these samples, no flame retardant halide was required. Even with relatively low flame retardant loadings, these samples performed very well in the flame retardancy tests. The samples were too flexible for the Notched Impact Test. However, with respect to optical properties, Sample 17, which contained the pentoxide particles, was transparent and performed well in the total color difference test, while Sample 18 (having trioxide particles) was opaque and performed much more poorly on the total color difference test.

The next synthetic resin tested was PET (polyethylene terephthalate). Samples 20 and 21 performed comparably on the flame retardancy tests. Although the ASTM D638 elongation percentage at break test is not conclusive, in this case the large discrepancy should be noted. In particular, Sample 20 (with small pentoxide particles) significantly outperformed Sample 21 (with larger trioxide particles) in this test. Once again, the optical properties were clearly superior for the composition including antimony pentoxide particles.

The next synthetic resin tested was polystyrene, as indicated in Samples 22 through 24. In this case, Sample 24 (with the larger trioxide particles) appeared to outperform Sample 23 (with the smaller pentoxide particles) in the flame retardancy tests. An increased loading of flame retardant would likely reduce the afterflame time and increase the percent LOI. The results of the Izod notched impact test were similar, with only a slight advantage to Sample 23. However, Sample 23 significantly outperforms Sample 24 with respect to optical properties.

The final alternative synthetic resin tested was a copolymer, which was a blend of polyethylene and polypropylene. All of these samples failed the UL-94 flame retardancy test and did not perform very well on the ASTM D2863 percent LOI test. Thus, a high loading of flame retardant would likely be required to result in adequate performance of these tests which would be expected based upon the performance of pure polyethylene. The physical properties of the composition with the smaller pentoxide particles are slightly better than the composition with the larger trioxide particles. In addition, the optical properties are better for Sample 26 (pentoxide) than for Sample 27 (trioxide).

EXAMPLE 3

For comparative purposes other flame retardants with reduced particle sizes were tested. In particular, smaller antimony trioxide particles, having a size of 0.138 microns, were tested. In previous tests, the antimony trioxide particles had a size of 1.00 microns. Also, compositions with slightly larger antimony pentoxide particles were tested. In particular, antimony pentoxide particles having a size of 0.050 microns and 150 microns were tested. In previous tests, the antimony pentoxide particles had a size of 0.030 microns. These tests all used polypropylene as the tested resin.

In addition, another series of tests using polypropylene were run on compositions using magnesium hydroxide $Mg(OH)_2$ as the flame retardant compound, in place of the antimony oxides. These compositions are shown in Table 3, samples 5 through 11. The loadings of the magnesium hydroxide flame retardants, either 50 or 62 weight percent, is significantly higher than the loadings required of antimony oxides. Commercial magnesium hydroxide, having a particle size of 5.00 microns and designated as "C.Mg" on Table 3, was tested alone and in a blend with a modified magnesium hydroxide, designated as "M.Mg" on Table 3. The modified magnesium hydroxide is colloidal and has a particle size of 0.225 microns. The best known commercial magnesium hydroxide, sold under the trademark KISSUMA by Kyowa Corporation of Japan, was also tested, and is designated as "K.Mg" on Table 3. In addition, Sample 6 and 8 were coated with a stearic acid lubricant. These compositions were prepared in the same manner as the samples of Examples 1 and 2 and were subjected to the same tests reported in Examples 1 and 2, as shown in Table 3.

Comparing the compositions of slightly larger-sized antimony pentoxide particles (samples 1 and 2 of Table 3) with sample 10 of Table 1, it is clear the flame retardancy and physical and optical properties are similar.

Furthermore, from a comparison of samples 1 and 2 of Table 3 with sample 15 of Table 1, it is apparent that the compositions with the slightly larger antimony pentoxide particles still have superior physical and optical properties compared to the compositions having antimony trioxide particles of 1.00 micron in size. A comparison of samples 2 and 3 of Table 3 reveals that antimony pentoxide particles are slightly preferred, as shown by the superior physical and optical properties of sample 2.

The modified magnesium hydroxide, when used alone, resulted in a composition with similar fire retardancy and physical and optical properties as commercial grade magnesium hydroxide with a particle size of 5.00 microns. However, as indicated by Sample 10 and 11, when the modified magnesium hydroxide was combined with a commercial magnesium hydroxide, a composition with superior properties resulted. In particular, comparing Sample 10 with Sample 9, the composition with the combined magnesium hydroxide particles has better flame retardancy properties while maintaining superior physical and optical properties. The test also showed that the stearic acid coating does not significantly affect the flame retardancy or physical or optical properties of the compositions.

EXAMPLE 4

Frequently, flame retardant compositions are mixed with thermal and ultra-violet stabilizers and/or smoke suppressants. To demonstrate the effects of such additives, compositions of the present invention were mixed with such stabilizers and smoke suppressants in the same manner as Examples 1 through 3 and subject to the same tests as discussed in Examples 1 through 3. The results of these tests are shown on Table 4. All samples in Table 4 used polypropylene resin.

The first of the thermal and ultra-violet stabilizers tested was THERMOLITE 31, designated as "T-31" on Table 4 and having a chemical name of dibutyltin bis(2-ethyl-hexyl) mercapto acetate, available from Atochem

TABLE 3

| | Flame Retardant Compound | Particle Size (microns) | Halide | % Flame Retardant | UL-94 | Afterflame (sec.) | ASTM D2863 % LOI |
|---|---|---|---|---|---|---|---|
| 1 | Pentoxide | 0.050 | Nonnen 52 | 2.5 | V-2 | 2.9 | 25.0 |
| 2 | Pentoxide | 0.150 | Nonnen 52 | 2.5 | V-2 | 2.4 | 24.0 |
| 3 | Trioxide | 0.138 | Nonnen 52 | 2.5 | V-2 | 7.0 | 23.5 |
| 4 | Trioxide | 0.138 | Nonnen 52 | 1.0 | Fail | N/A | 19.0 |
| 5 | C.Mg | 5.00 | None | 50.0 | Fail - 2nd burn | non-drip | 21.5 |
| 6 | K.Mg(coated) | 5.00 | None | 50.0 | Fail - 1st burn | non-drip | 21 |
| 7 | M.Mg | 0.225 | None | 50.0 | Fail - 2nd burn | non-drip | 26 |
| 8 | M.Mg(coated) | 0.225 | None | 50.0 | Fail - 1st burn | non-drip | 23 |
| 9 | C.Mg | 5.00 | None | 62.0 | Fail - 2nd burn | 48.0 | 25 |
| 10 | C.Mg/M.Mg | 5.00/.225 | None | 62.0(50/12) | V-1 | 19.0 | 25.5 |
| 11 | C.Mg/M.Mg | 5.00/.225 | None | 50.0(40/10) | Fail - 1st burn | non-drip | 24 |

| | Flame Retardant Compound | ASTM D256 Notched Izod Impact | ASTM D638 % Elongation @ Yield | ASTM D638 Tensile Strength @ Yield | Opacity | L.a.b. |
|---|---|---|---|---|---|---|
| 1 | Pentoxide | 0.64 | 15.9 | 5144 | S. Transparent | 37.25 |
| 2 | Pentoxide | 0.67 | 426.29 | 3477 | S. Transparent | 37.00 |
| 3 | Trioxide | 0.424 | 262.63 | 2988 | V.S. Transparent | 42.54 |
| 4 | Trioxide | 0.45 | 313.83 | 3531 | Transparent | 22.69 |
| 5 | C.Mg | 0.23 | 0.48 | 3542 | Opaque | 3.90 |
| 6 | K.Mg(coated) | 0.31 | 2.11 | 2877 | Opaque | 0.00 |
| 7 | M.Mg | 0.26 | 0.54 | 2755 | Opaque | 3.46 |
| 8 | M.Mg(coated) | 0.26 | 1.20 | 2969 | Opaque | 2.57 |
| 9 | C.Mg | 0.29 | 0.23 | 4016 | Opaque | 11.5 |
| 10 | C.Mg/M.Mg | 0.30 | 0.90 | 3097 | Opaque | 3.44 |
| 11 | C.Mg/M.Mg | 0.34 | 0.99 | 3619 | Opaque | 13.74 |

For all tests reported on this Table, polypropylene was used as the synthetic resin.

of King of Prussia, Pa. In addition, a compound sold under the trademark IRGANOX B-1411, designated as "B-1411" on Table 4 and having a chemical composition of Tris(3,5-di-tert-butyl-4-hydroxybenzyl) isocyanurate and Tris(2,4-di-tert-butylphenyl) phosphite, in a 1:1 blend. Another light stabilizer tested was a hindered amine derivative sold under the trademark TINUVIN 123, designated as "123" on Table 4, and available from Ciba-Geigy Corporation of Hawthorne, N.Y. The above additives were tested individually, and various blends of the IRGANOX B-1411 and TINUVIN 123 were also tested.

A variety of smoke suppressants were also used. These included a zinc borate having a particle size of 250 mm, sold under the trademark FIREBRAKE ZB (sometimes designated as "ZB" on Table 4) and available from U.S. Borax of Los Angeles, Calif. Another commercial smoke suppressant used was ammonium octylmolybdate (AOM). Molybdenum trioxide having a particle size of 321 nm and designated as "MoO" on Table 4, was used in Samples 13 and 15.

In addition, a control, Sample 16, which contained no additives and 2.5 weight percent antimony pentoxide flame retardant, was also tested. Compositions including Potters beads were also tested. Finally, a composition with stabilized IRGANOX B-1411 was also tested with polypropylene which was extruded at a higher temperature than normal. Table 4 shows the tests results for these compositions.

TABLE 4

| | Flame Retardant Compound* | Weight % Flame Retardant | Additive | Weight % Additive | UL-94 | Afterflame (sec.) | ASTM D2863 % LOI |
|---|---|---|---|---|---|---|---|
| 1 | Pentoxide | 2.5 | T-31 | 1.0 | Fail | N/A | 22.5 |
| 2 | Pentoxide | 2.5 | T-31 | 0.1 | Fail | N/A | 23.5 |
| 3 | Pentoxide | 2.5 | B-1411 | 0.25 | V-2 | 34.0 | 23.0 |
| 4 | Pentoxide | 2.5 | 123 | 0.5 | V-2 | 9.0 | 23.5 |
| 5 | Pentoxide | 2.5 | B-1411/123 | 0.25/0.5 | V-2 | 24.0 | 24.0 |
| 6 | Pentoxide | 2.5 | B-1411/123 | 0.1/0.25 | V-2 | 31.0 | 22.5 |
| 7 | Pentoxide | 2.5 | B-1411/123 | 0.5/1.0 | V-2 | 7.0 | 21.5 |
| 8 | Pentoxide | 2.5 | Firebrake ZB | 0.5 | V-2 | 2.0 | 22.5 |
| 9 | Pentoxide | 2.5 | AB (250 nm) | 0.5 | V-2 | 29.0 | 21.5 |
| 10 | Trioxide | 2.5 | Firebrake ZB | 0.5 | V-2 | 18.0 | 23.5 |
| 11 | Trioxide | 2.5 | ZB (250 nm) | 0.5 | V-2 | 8.0 | 24.0 |
| 12 | Pentoxide | 2.5 | AOM | 0.75 | V-2 | 38.0 | 22 |
| 13 | Pentoxide | 2.5 | MoO (321 nm) | 0.75 | V-2 | 2.0 | 24.5 |
| 14 | Trioxide | 2.5 | AOM | 0.75 | V-2 | 13.0 | 23.5 |
| 15 | Trioxide | 2.5 | MoO (321 nm) | 0.75 | V-2 | 2.8 | 24.0 |
| 16 | Pentoxide | 2.5 | None | N/A | V-2 | 2.9 | 25.0 |
| 17 | Pentoxide | 2.5 | Potters | 1.0 | - | DID NOT TEST | |
| 18 | Pentoxide | 2.5 | Potters | 5.0 | V-2 | 1.5 | 23 |
| 19 | Pentoxide | 2.5 | B-1411 (stab) | 0.25 | Fail - 2 | N/A | 21.5 |

| | Flame Retardant Compound* | ASTM D256 Notched Izod Impact | ASTM D638 % Elongation @ Yield | ASTM D638 Tensile Strength @ Yield | Opacity | L.a.b. |
|---|---|---|---|---|---|---|
| 1 | Pentoxide | 0.53 | 219.89 | 2726 | S. Transparent | 36.61 |
| 2 | Pentoxide | 0.554 | 249.60 | 2866 | S. Transparent | 38.02 |
| 3 | Pentoxide | 0.60 | 491.43 | 2685 | S. Transparent | 36.37 |
| 4 | Pentoxide | 0.50 | 415.09 | 3185 | S. Transparent | 36.62 |
| 5 | Pentoxide | 0.47 | 308.57 | 3369 | S. Transparent | 36.68 |
| 6 | Pentoxide | 0.37 | 271.77 | 3403 | S. Transparent | 36.23 |
| 7 | Pentoxide | 0.40 | 342.86 | 2862 | S. Transparent | 34.73 |
| 8 | Pentoxide | 0.874 | 459.89 | 3177 | S. Transparent | 38.05 |
| 9 | Pentoxide | 0.403 | 327.31 | 3278 | S. Transparent | 34.63 |
| 10 | Trioxide | 0.89 | 418.74 | 5878 | Opaque | 47.68 |
| 11 | Trioxide | 0.400 | 256.69 | 3456 | Opaque | 47.54 |
| 12 | Pentoxide | 0.653 | 526.17 | 4677 | Opaque | 27.79 |
| 13 | Pentoxide | 0.486 | 298.97 | 3262 | Opaque | 7.10 |
| 14 | Trioxide | 0.68 | 530.06 | 4415 | Opaque | 50.12 |
| 15 | Trioxide | 0.486 | 300.34 | 3138 | Opaque | 19.73 |
| 16 | Pentoxide | 0.64 | 15.9 | 5144 | S. Transparent | 19.39 |
| 17 | Pentoxide | | | DID NOT TEST | | |
| 18 | Pentoxide | 0.56 | 163.66 | 5885 | V.S. Transparent | 42.86 |
| 19 | Pentoxide | 0.60 | 385.83 | 2300 | Transparent | 29.53 |

For all tests reported on this Table, polypropylene was used as the synthetic resin and Nonnen 52 was used as the halide.
*For all test reported on this Table, Antimony Pentoxide had a particle size of 30 nm and Antimony Trioxide had a particle size of 1000 nm.

From the results of the compositions with the thermal and ultra-violet stabilizers, the composition including THERMOLITE 31 could not perform adequately either in the flame retardancy tests or physical and optical tests. The composition which included only TINUVIN 123 performed the best of any of the seven samples tested. The next best result was Sample 7, which included 0.5 weight percent of IRGANOX B-1411 and 1.0 weight percent TINUVIN 123. Sample 19, did not pass the UL-94 flame retardancy test (failing on the second burn) but had certain better optical properties than Sample 3, which included the same additives (IRGANOX B 1411) in the same amount (0.25 weight percent), but was extruded at lower temperature than Sample 19.

With respect to Samples 8 through 18, the results were mixed. The mixed results could be explained because suppressing smoke may allow the material to burn more efficiently, and therefore worsen the performance in the flame retardancy tests. Generally, the flame retardancy characteristics were better with the small particle size zinc borate and molybdenum trioxide than with the standard commercial grade smoke suppressants. In addition, the optical properties were also generally better with the smaller sized particles. Potters beads are glass beads and can help reduce dripping of the burning resin.

EXAMPLE 5

Several other halogenated compounds were also tested to determine their capabilities. In particular, a halogenated flame retardant sold under the trademark FR 1034, a tetrabromo dipentaerythritol (also known as Dead Sea Bromine) available from Ameribrom of New York, N.Y., was tested. Also tested was a flame retardant halogen sold under the trademark PB 370, a brominated phosphate ester, available from FMC Corporation of Philadelphia, Pa. The results of these compositions using the above halogens are shown on Table 5. Another halogen, small particle size ATH (aluminum trihydrate) available from Solem Industries of Norcross, Ga. was also tested, but the results of these tests are not shown on Table 5 because of difficulties encountered in processing the material.

TABLE 5

| Flame Retardant Compound* | Halide | % Flame Retardant | UL-94 | After-flame (sec.) | ASTM D2863 % LOI | ASTM D256 Notched Izod Impact | ASTM D638 % Elongation @ Yield | ASTM D638 Tensile Strength @ Yield | Opacity | L.a.b. |
|---|---|---|---|---|---|---|---|---|---|---|
| 1 Pentoxide | FR 1034 | 4.0 | Fail | 41.0 | 24 | 0.43 | 452.80 | 2994 | V.S. Transparent | 47.09 |
| 2 Pentoxide | FR 1034 | 1.0 | Fail | N/A | 23.5 | 0.45 | 270.17 | 1849 | Transparent | 30.03 |
| 3 Trioxide | FR 1034 | 4.0 | V-2 | 17.0 | 23.0 | 0.56 | 261.49 | 3672 | Transparent | 29.39 |
| 4 Trioxide | FR 1034 | 1.0 | | | | Extruder clogged - DID NOT TEST | | | | |
| 5 Pentoxide | PB-370 | 4.0 | Fail | N/A | 21.0 | 0.471 | 266.97 | 3014 | V.S. Transparent | 39.41 |
| 6 Pentoxide | PB-370 | 1.0 | Fail | N/A | 19.0 | 0.456 | 287.77 | 3561 | Transparent | 14.25 |
| 7 Pentoxide | PB-370 | 1.0 | Fail | N/A | 19.0 | 0.456 | 312.46 | 2866 | Transparent | 14.97 |

For all tests reported on this Table, polypropylene was used as the synthetic resin.
*For all test reported on this Table, Antimony Pentoxide had a particle size of 30 nm and Antimony Trioxide had a particle size of 1000 nm.

In comparing the mixtures having the FR 1034 halide, to the mixtures having Nonnen 52 (see Samples 9, 11, 14 and 16 of Table 1), it can be seen that FR 1034 performs reasonably well, especially with respect to flame retardancy. The second flame retardant, PB 370, did not perform as well. In particular, the composition with 4% PB-370 failed the UL-94 flame retardancy test.

It is understood that various other modifications will be apparent to and can be readily made by those skilled in the art without departing from the spirit and scope of this invention. Accordingly, it is not intended that the scope of the claims appended hereto be limited to description set forth herein, but rather that the claims be construed as encompassing all of the features of patentable novelty that reside in the present invention, including all features that would be treated as equivalence thereof by those skilled in the art to which this invention pertains.

What is claimed:

1. An extrudable composition comprising a synthetic resin and retardant particles intimately dispersed in said resin, said particles having the capacity to retard fire or smoke generation in said synthetic resin, substantially all of said particles having a maximum particle size below 100 nanometers.

2. A composition as recited in claim 1, wherein said synthetic resin is a polyolefin and said particles consist of antimony pentoxide.

3. A composition of matter, as recited in claim 2, wherein said polyolefin is polypropylene.

4. A composition as recited in claim 3, wherein substantially all of said particles have a maximum particle size of below 50 nanometers (0.050 μ).

5. A composition as recited in claim 4, wherein substantially all of said particles have a particle size of below 30 nanometers (0.030 μ).

6. A composition as recited in claim 5, wherein said composition further includes a halogenated organic compound having the capacity to retard flame generation in said synthetic resin.

7. A composition as recited in claim 6, wherein said halogenated organic compound is a brominated alkoxydiphenyl sulfone, and said brominated alkoxydiphenyl sulfone is present at a molar ratio of between 1:2 and 1:7 moles of antimony to moles of bromine.

8. A composition as recited in claim 7, wherein said brominated alkoxydiphenyl sulfone is present at a molar ratio of 1 mole antimony to 3 moles bromine.

9. A composition as recited in claim 1, wherein said particle size is below 50 nanometers (0.050 μ).

10. A composition as recited in claim 1, wherein said composition further includes a halogenated organic compound having the capacity to retard flame generation in said synthetic resin.

11. A composition as recited in claim 10, wherein said halogenated organic compound is a brominated alkoxydiphenyl sulfone.

12. A composition as recited in claim 2, wherein said composition further includes a halogenated organic compound having the capacity to retard flame generation in said synthetic resin.

13. A composition as recited in claim 12, wherein said halogenated organic compound is a brominated alkoxydiphenyl sulfone present at a molar ratio of 1 mole antimony to 3 moles bromine.

14. A composition as recited in claim 13, wherein said polyolefin is polypropylene.

15. A composition as recited in claim 14, wherein substantially all of said particles have a particle size of below 30 nanometers (0.030 μ).

16. A composition as recited in claim 1, wherein substantially all of said particles have a maximum particle size below 50 nanometers (0.050 μ).

17. A composition as recited in claim 16, wherein substantially all of said particles have a maximum particle size below 30 nanometers (0.030 μ).

18. A composition as recited in claim 1 wherein said particles comprise antimony pentoxide.

19. A composition as recited in claim 16 wherein said particles comprise antimony pentoxide.

20. A composition as recited in claim 17 wherein said particles comprise antimony pentoxide.

21. A composition as recited in claim 1 wherein said particles comprise antimony trioxide.

22. A composition as recited in claim 16, wherein said synthetic resin is selected from the group consisting of polypropylene, polyethylene, and copolymer blends thereof.

23. A composition as recited in claim 19, wherein said synthetic resin is selected from the group consisting of polypropylene, polyethylene, and copolymer blends thereof.

24. A composition as recited in claim 20, wherein said synthetic resin is selected from the group consisting of polypropylene, polyethylene, and copolymer blends thereof.

25. A composition as recited in claim 21, wherein said synthetic resin is selected from the group consisting of polypropylene, polyethylene, and copolymer blends thereof.

26. A composition as recited in claim 1, wherein said synthetic resin is selected from the group consisting of polypropylene, polyethylene, ABS, nylon 6, PVC, PET, polystyrene, and co-polymer blends thereof.

* * * * *